Feb. 1, 1966     R. C. WALLACE ETAL     3,232,244
COTTON CANDY MACHINE

Filed March 29, 1962     4 Sheets-Sheet 1

RICHARD C. WALLACE
PAUL MADWIN
DONALD W. HERRICK
WILLIAM D. SMULLIN
INVENTORS.

BY *Albert Herzog*

ATTORNEY.

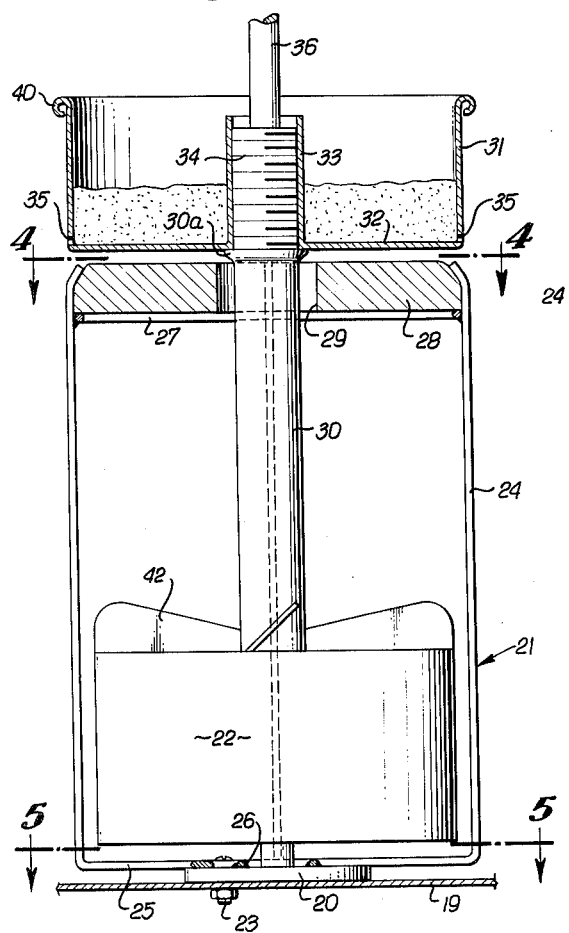
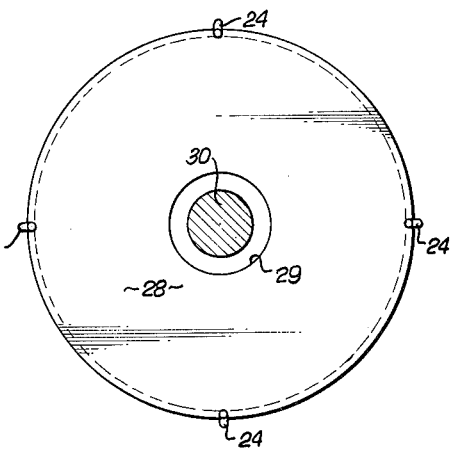
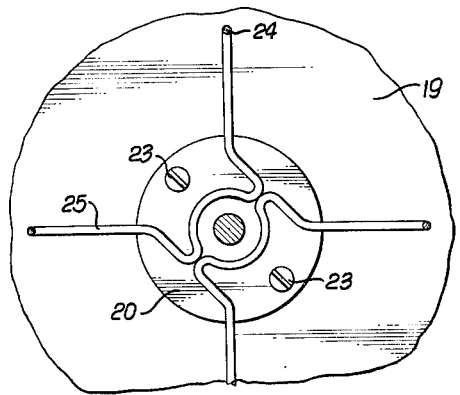
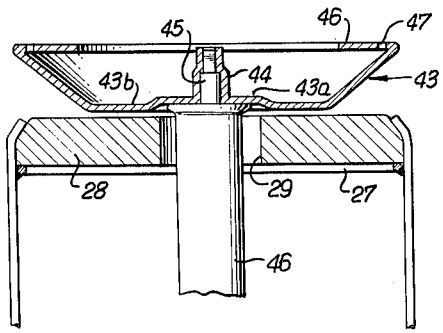

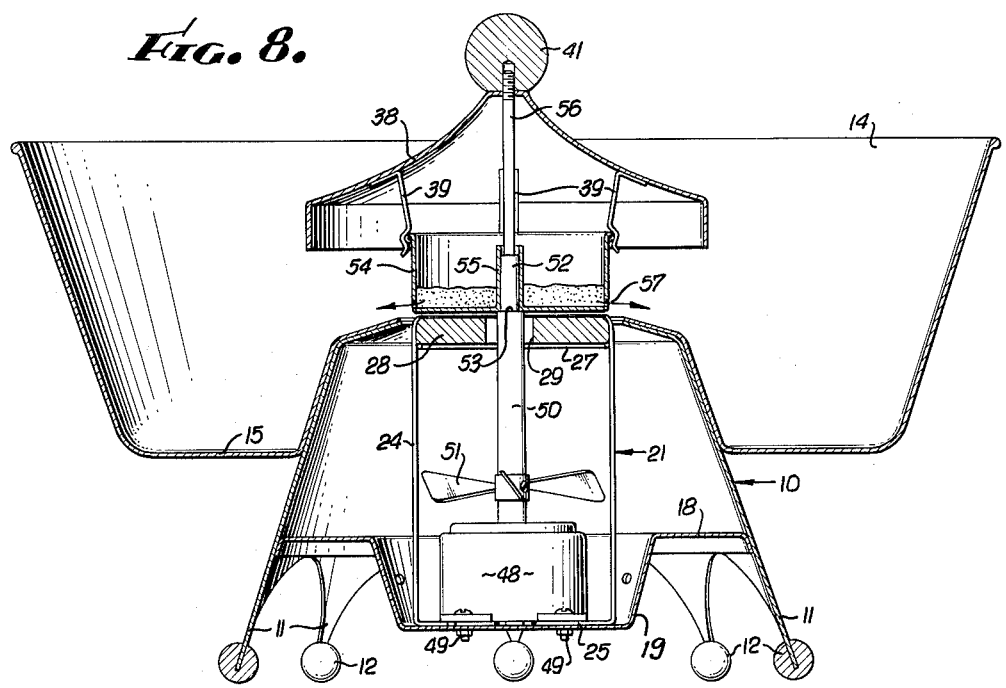

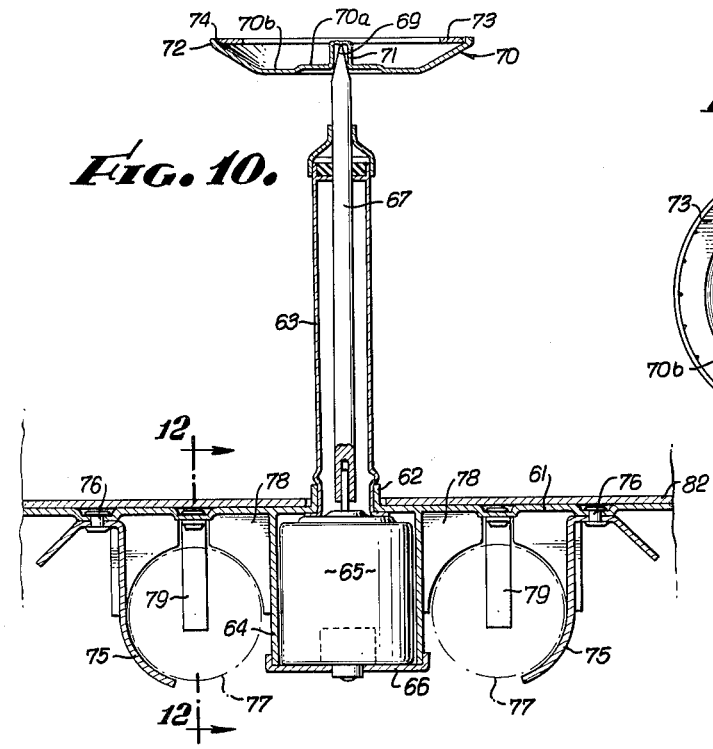
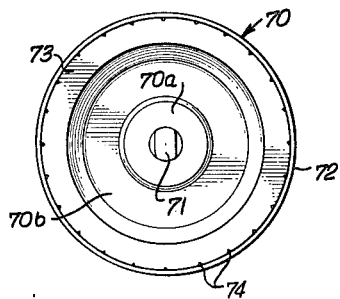
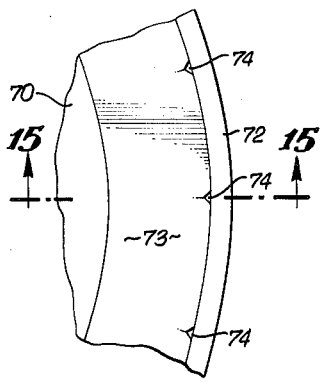
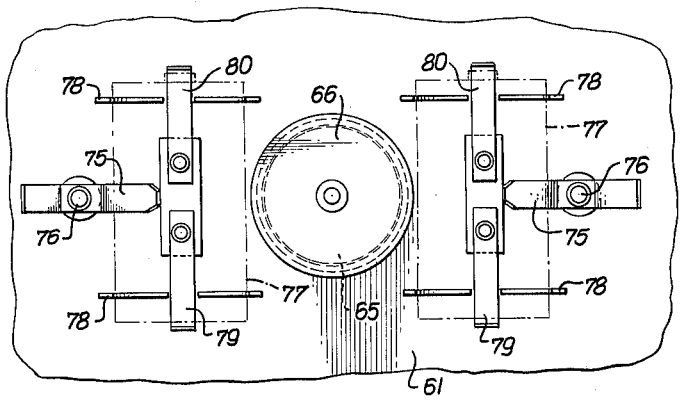
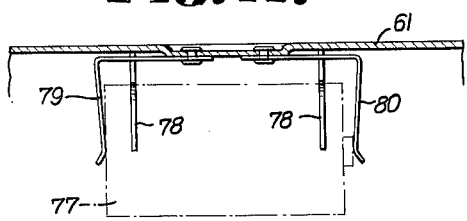
RICHARD C. WALLACE
PAUL MADWIN
DONALD W. HERRICK
WILLIAM D. SMULLIN
INVENTORS.
BY *Albert Herzig*
ATTORNEY.

United States Patent Office 3,232,244
Patented Feb. 1, 1966

3,232,244
COTTON CANDY MACHINE
Richard C. Wallace, Pasadena, Paul Madwin, Los Angeles, Donald W. Herrick, Gardena, and William D. Smullin, La Puenta, Calif., assignors to Link Research and Development Corp., a corporation of California
Filed Mar. 29, 1962, Ser. No. 183,591
2 Claims. (Cl. 107—8)

This invention relates to candy making apparatus and more especially to a continuous dispenser of candy, sometimes known as fluff or cotton candy.

An object of the invention is to provide novel improvements in a continuous dispenser of fluff type or cotton candy.

Another object of the invention is to provide a simplified candy dispenser wherein the several parts may be readily assembled and disassembled for cleaning.

A further object of the invention is to provide a novel container for the sugar having improved means for dispensing the sugar when cooked in the fluff form.

An additional object of the invention is to provide novel improvements in the cotton candy machine having improved and simplified drive means for the rotary elements thereof.

Another object of the invention is to provide an improved cotton candy dispenser as in the previously mentioned objects and in which no direct heating means is required.

Another object of the invention is to provide a simplified cooker and dispenser of fluff type or cotton candy which incorporates a self-powered drive for the rotary element thereof.

Other objects and advantages of the invention will appear and be brought out more fully in the following specification, reference being added to the accompanying drawings herein.

FIGURE 3 is a partial view in section showing the heater, the dispensing cup and the motor drive therefor.

FIGURE 4 is a sectional view taken along line 4—4 of FIGURE 3.

FIGURE 5 is a sectional view taken along line 5—5 of FIGURE 3.

FIGURE 6 is a fragmentary view in section showing a modified form of sugar holding and dispensing cup.

FIGURE 8 is a view similar to FIGURE 2 showing a modified form of motor drive.

FIGURE 9 is a view similar to FIGURE 8 showing a modified form of candy dispenser.

FIGURE 10 is a partial view of the same on an enlarged scale.

FIGURE 11 is a bottom view of the same.

FIGURE 12 is a sectional view taken along line 12—12 of FIGURE 10.

FIGURE 13 is a top plan view of the sugar dispensing cup shown in FIGURE 10.

FIGURE 14 is a fragmentary view of the same on an enlarged scale.

FIGURE 15 is a sectional view taken along line 15—15 of FIGURE 14.

Figure 1:
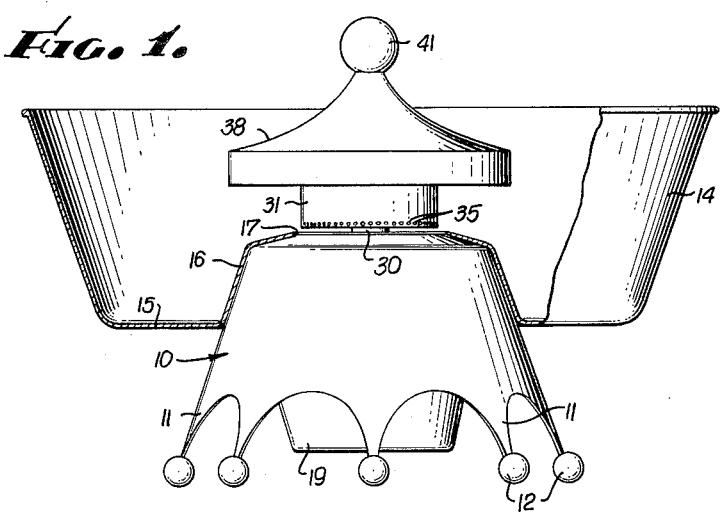
FIGURE 1 is a side-view partly broken away showing one form of candy dispenser of this invention.
Figure 2:
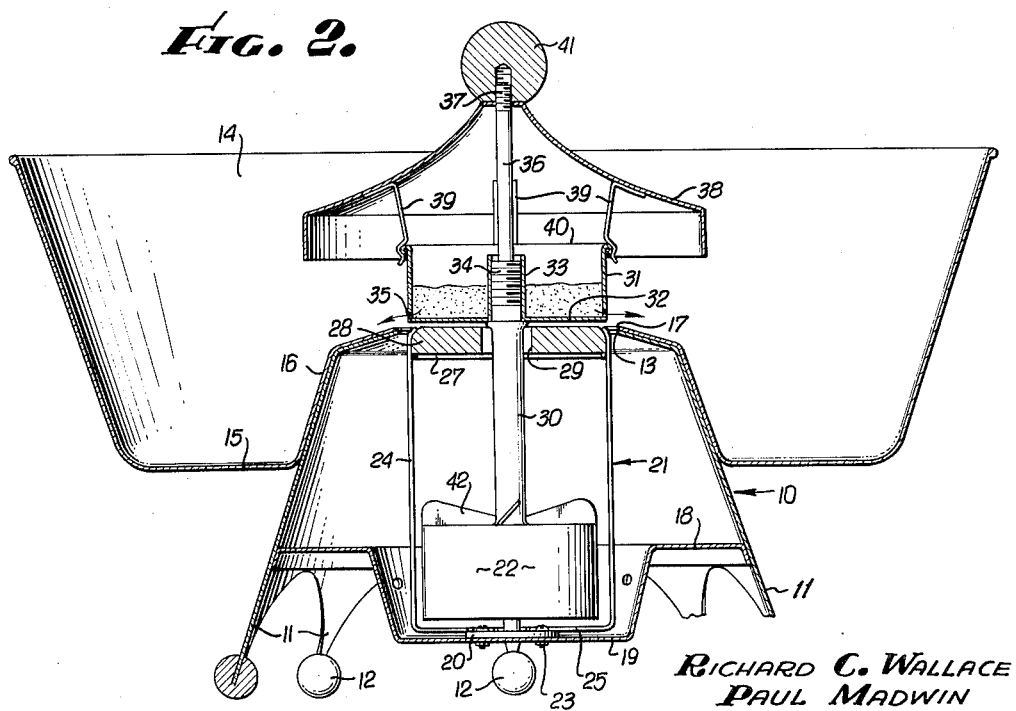
FIGURE 2 is a sectional elevational view of the same on an enlarged scale.

Referring more particularly to the drawings, the candy dispenser of FIGURES 1 to 7 of this invention comprises a hollow, generally circular base frame 10, having the form of a truncated pyramid preferably made of stamped or formed sheet metal, the lower portion of which has a plurality of legs 11 having ball shaped wood feet 12. The wall of frame 10 is sloped inwardly sharply toward the center at the top and has an annular opening 13. A pan 14 is secured on base frame 10, the bottom of the pan being extended upwardly and inwardly at 16 conforming to the shape of the upper portion of the wall of frame 10 and has a central opening 17 coinciding with opening 13 of the base frame.

A base plate 18 is secured to the wall of base frame 10 and has a depressed central portion 19. A spacer disc 20 on base plate portion 19 supports and secures a heater frame 21 and also provides a mounting for a rotary frame motor 22 of conventional construction, the disc being secured to portion 19 by bolts 23 or the equivalent. The heater frame 21 is formed of a pair of rods or wires 24, the lower portions 25 thereof being bent inwardly and secured, as by welding 26, to disc 20. A ring 27 is secured as by welding to rods or wires 24 near the upper ends thereof and supports an electric heating element 28 in the form of a toroid and having a central opening 29 therein, the upper ends of wires or rods 24 being bent inwardly in order to secure the heater on ring 27.

The motor 22 has a cylindrical frame and a vertical shaft 30 extends upwardly from the motor frame and through pan openings 13 and 17 respectively and through opening 29 in heater 28. Shaft 30 carries a cup 31 having a bottom 32, the central portion of which is extended upwardly at 33 in the form of a tube which has internal threads 34 on the upper end mating with external threads 34 on the upper end of motor shaft 30 which is formed with a flange 30a providing a partial support for the cup and a space between the bottom 32 of the cup and heater 28. A plurality of apertures 35 are formed in the sidewall of cup 31 near the bottom thereof.

Shaft 30 has an upper extension 36 of reduced diameter, the upper end thereof being threaded at 37. A flared cover 38 for cup 31 is seated thereon by a plurality of spring clips 39 which depend downwardly from the underside of the cover and rest on the rolled upper edge 40 of the cup. Cover 38 has a central opening through which shaft extension 36 extends, the cover being secured on the cup by a ball nut 41 which is run on threads 37 of the shaft extension 36. A fan 42 is suitably secured on motor shaft 30 at the upper end of motor 22.

Figure 7:
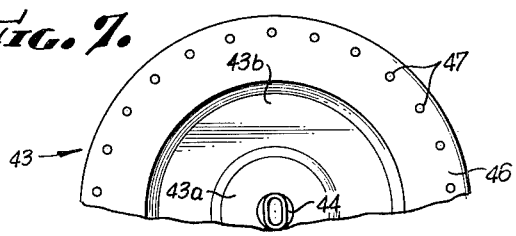
FIGURE 7 is a partial top view of the same.

FIGURES 6 and 7 show a cup 43 of modified form which is generally saucer shaped and having a hub 44 which is oval shaped and seats on a similarly shaped upper end 45 of a modified motor shaft 46. The rim of cup 43 is formed radially inwardly at the top at 46 and has a plurality of small apertures 47 adjacent the sloping wall thereof. Cup 43 may be readily removed from shaft 46 by being merely lifted therefrom, whereas removal of cup 31 is done by unscrewing it from the threaded end 34 of shaft 30. Power for driving motor 22 and energizing heater 28 is supplied by customary wiring, not shown. Cover 38 for cup 31 is a safety feature and serves to prevent inadvertent contact with the cup and prevents an accidental burn.

In the operation of the candy dispenser of FIGURES 1 to 7, a quantity of sugar is placed in cup 31 or 43 which is rotated by motor 22 and the heat from heater 28 melts and cooks the sugar into a candy form which is dispensed radially outwardly through apertures 35 or 47 into pan 14 in fluff or cotton-type formation and is removed therefrom as desired.

FIGURE 8 shows a modified cup structure and its support on a modified motor. In this figure a motor 48 has a frame secured by bolts 49 to frame portion 19 of the base frame 10. Motor 48 mounts a vertical shaft 50 on which is secured a fan 51. Shaft 50 has a reduced diameter portion 52 forming a shoulder 53 on which is positioned a cup 54 having an upstanding central tubular portion 55 in which is received the reduced diameter portion 52 of the shaft. A further reduced diameter upper end portion 56 of the shaft 50 supports cup cover 38 in the manner of the form of the invention shown in FIGURES 1 to 7. Cup 54 has a peripherally disposed array of small apertures 57 in the lower portion of the wall portion thereof or otherwise positioned if desired in order to dispense the candy in the fluff or cotton-type into the pan 14.

FIGURES 9 to 15 show a further modified form of the invention. In these figures there is shown a base frame 60 generally similar to base frame 10 having an upper plate portion 61 having a central opening formed by an upstanding annular flange 62. A bearing tube 63 is secured at its lower end within flange 62 and a motor housing or casing 64 extends downwardly from and is suitably secured as by welding or otherwise to the underside of plate 61 and is coaxial with tube 63. The housing 64 encloses a motor 65 which is supported therein by an appropriate end plate or cap 66. The shaft of motor 65 mounts a cup drive spindle 67, the upper end thereof being extended through a bearing of conventional construction located in the upper end of bearing tube 63. The upper end of spindle 67 is non-circular and is shown as having a tapered formation 69 such as a screw-driver point. A somewhat saucer shaped candy dispensing cup 70 is removably positioned on the upper end of drive spindle 67 and is formed with a central recess 71 which is non-circular in cross-section and with a size and shape to receive the pointed end 69 of the drive spindle 67. Cup 70 is formed with an upstanding flange or rim 72. An annular top plate 73 is secured within the flange 72 of the cup by a swage or rolled manipulation of flange 72. The edge of plate 73 is notched or formed with suitable apertures 74 disposed in peripheral array and providing dispensing passages for the candy as it is formed.

Apertures 74 may be formed in upwardly swaged edge portions 73a of the plate. The bottom of cup 43 is dented upwardly at the center forming a raised center section 43a (FIG. 6) and a lower outer section 43b in order to gain an even melt of the sugar being cooked. Cup 70 (FIG. 13) is similarly formed with a raised center section 70a and lower outer section 70b. When being cooked there will be less sugar in the middle section and it will not be as deep as in the outer section. This offsets the known tendency of a pan to become hotter near the periphery than nearer the center when heated on heating elements such as the toroid 28.

A pair of battery hold-down clips 75 are each pivotally carried by rivets 76 extending through base frame plate 61 for supporting batteries 77. Pairs of plates 78 are mounted on the underside of base plate 61 and have semi-circular edge formations for positioning batteries 77 when secured in position by hold-down clips 75. Battery terminals 79 and 80 are secured to plate 61. A pan 82 generally similar to pan 14 is positioned on base plate 61 near the central opening through which flange 62 extends for centering the pan on the plate. Motor 65 is powered from batteries 77 by suitable circuit wiring, not shown. Batteries 17, their supports and the circuit wiring, and the motor 65 provides self-powered drive means for the shaft 67. Cup 70 may be readily removed from its mounting on the top of drive spindle 67 for cleaning or other purposes. The securement of cup 70 on the drive spindle as shown is illustrative of a typical securement and may be modified if desired.

For example, the end of the spindle may be star-shaped and the recess in the cup correspondingly shaped or have other form to provide positive drive of the cup on the spindle and permit ready removal therefrom. Both cups 43 and 70 will, during operation, spin in a substantially horizontal position by reason of the centrifugal action of the rotation thereof.

The operation of the modification of FIGURES 9–15 is substantially similar to that of FIGURES 1 to 7. However instead of unmelted sugar a quantity of cooked and melted sugar is placed in cup 70 having been heated by other heating means and upon rotation of the spindle and cup the fluff type or cotton candy will be dispensed through aperture openings 74 and be deposited in pan 82, from which it may be removed as desired.

While the instant invention has been shown and described herein in what is conceived to be the most practical and preferred embodiments it is recognized that departures may be made therefrom within the scope of the invention which is, therefore, not to be limited to the details disclosed herein but to be afforded the full scope of the claims appended hereto.

What is claimed is:

1. In a candy dispenser in combination; a base frame, a pan on said frame, a vertical shaft mounted for rotation in said pan, a dispensing cup having a wall on the upper end of said shaft having a peripheral array of openings adjacent the wall thereof, said cup having a portion of lesser depth adjacent said shaft, battery powered drive means for said shaft and said cup having an inwardly extending lip, said openings being formed in said lip.

2. In a candy dispenser in combination; a base frame, a pan on said frame, a vertical shaft mounted for rotation in said pan, a dispensing cup on the upper end of said shaft and drive means for said shaft, said cup being saucer shaped having an inturned annular flange at the rim thereof, the outer edge of said flange being swaged inwardly to form an inwardly extending annular lip, said lip having a plurality of circumferentially spaced apertures.

References Cited by the Examiner

UNITED STATES PATENTS

| 1,489,342 | 4/1924 | Brent | 107—8.7 |
| 1,530,910 | 3/1925 | Parcell | 107—8.7 |
| 3,019,745 | 2/1962 | Du Bois et al. | 107—8.7 |

WALTER A. SCHEEL, *Primary Examiner.*

CHARLES A. WILLMUTH, ROBERT E. PULFREY,
*Examiners.*